United States Patent
Takemoto

(10) Patent No.: US 7,830,334 B2
(45) Date of Patent: Nov. 9, 2010

(54) IMAGE DISPLAYING METHOD AND APPARATUS

(75) Inventor: Kazuki Takemoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 734 days.

(21) Appl. No.: 10/898,248

(22) Filed: Jul. 26, 2004

(65) Prior Publication Data

US 2005/0024388 A1 Feb. 3, 2005

(30) Foreign Application Priority Data

Jul. 30, 2003 (JP) ............................. 2003-203939

(51) Int. Cl.
*G02F 1/1333* (2006.01)
(52) U.S. Cl. ............................................. 345/8; 345/7
(58) Field of Classification Search ................... 345/7, 345/8
See application file for complete search history.

(56) References Cited

U.S. PATENT DOCUMENTS

| | | | |
|---|---|---|---|
| 5,751,494 A * | 5/1998 | Takahashi | 359/631 |
| 6,570,588 B1 * | 5/2003 | Ando et al. | 715/728 |
| 7,106,324 B1 * | 9/2006 | Takahashi | 345/423 |
| 7,289,130 B1 | 10/2007 | Satoh et al. | |
| 2001/0024202 A1 * | 9/2001 | Kobayashi | 345/422 |
| 2002/0072416 A1 * | 6/2002 | Ohshima | 463/43 |
| 2002/0106135 A1 * | 8/2002 | Iwane | 382/305 |
| 2002/0156144 A1 * | 10/2002 | Williams et al. | 522/71 |
| 2002/0158873 A1 * | 10/2002 | Williamson | 345/427 |
| 2003/0156109 A1 * | 8/2003 | Iwanaga | 345/419 |
| 2003/0156144 A1 * | 8/2003 | Morita | 345/848 |
| 2003/0179198 A1 * | 9/2003 | Uchiyama | 345/427 |
| 2006/0073892 A1 * | 4/2006 | Watanabe et al. | 463/34 |

FOREIGN PATENT DOCUMENTS

| | | |
|---|---|---|
| EP | 1 060 772 A2 | 12/2000 |
| EP | 1 117 074 A2 | 7/2001 |
| EP | 1117074 A2 * | 7/2001 |
| JP | 1-166265 | 6/1989 |
| JP | 7-200878 | 8/1995 |
| JP | 7-306379 | 11/1995 |
| JP | 2000-353248 | 12/2000 |
| JP | 2001-195601 | 7/2001 |

OTHER PUBLICATIONS

"Development of a Remote Collaboration System that Enables Mutual Monitoring", J. Yamashita et al., TVRSJ, vol. 4, No. 3, pp. 495-504 (with English Abstract).

(Continued)

*Primary Examiner*—Bipin Shalwala
*Assistant Examiner*—Afroza Y Chowdhury
(74) *Attorney, Agent, or Firm*—Fitzpatrick, Cella, Harper & Scinto

(57) ABSTRACT

Image exhibiting method of exhibiting an image of mixed reality space is provided. A three-dimensional visual-field area of an observer in the mixed reality space is calculated, a virtual visual-field object representing the visual-field area is generated, and the virtual visual-field object is superimposed on the image of the mixed reality space to be exhibited.

5 Claims, 10 Drawing Sheets

OTHER PUBLICATIONS

Billinghurst, et al., "Collaborative Mixed Reality", Mixed Reality, Merging Real and Virtual Worlds Ohmsha, Tokyo, Japan, 1999, pp. 261-284.

Takemura, et al., "Diminishing head-mounted display for shared mixed reality", Mixed and Augmented Reality, 2002, ISMAR 2002, Proceedings, International Symposium on Sep. 30-Oct. 1, 2002, Piscataway, NJ, IEEE, Sep. 30, 2002, pp. 149-156.

Watt, Alan, "3D Computer Graphics, Chapter 5: The graphics pipeline (1)", Addison-Wesley, Harlow, England, UK, pp. 142-166.

Hideyuki Tamura, et al., "Mixed Reality: Future Dreams Seen at the Border Between Real and Virtual Worlds", IEEE, *Computer Graphics and Applications*, vol. 21, No. 6., Nov./Dec. 2001, pp. 64-70.

Akinari Takagi, et al., "Development of Stereo Video See-Through HMD for AR Systems", IEEE, ISAR 2000, pp. 68-77.

* cited by examiner

IMAGE DISPLAYING METHOD AND APPARATUS

FIELD OF THE INVENTION

The present invention relates to a mixed reality exhibiting technique for exhibiting an observer a fusion of the real space and a virtual image produced by, e.g., computer graphics.

BACKGROUND OF THE INVENTION

A generally known method of observing mixed reality space includes the video see-through method and the optical see-through method. With the former, image data of actual space sensed by a video camera or the like is synthesized with an image such as computer graphics (CG) or the like and the synthesized image is exhibited to an observer. With the latter, an image such as CG is overlapped on a half-transmitting (see-through) display device.

There are three methods for exhibiting mixed reality space to an observer: having the observer wear a head mounted display (HMD) for exhibiting an image, setting a display device near the observer to exhibit an image, and having the observer operate a hand-held display device and changing the displayed image based on motion of the observer's body for exhibiting an image. As an apparatus for expressing mixed reality space, a combination of the three exhibiting methods and the aforementioned video see-through method or the optical see-through method may be considered.

There are cases that the mixed reality space, realized by any of the aforementioned combination, is shared by plural persons for performing cooperative work. In this case, grasping where each person is looking at in the mixed reality space contributes to smooth proceeding of work. For instance, assume that a worker (exhibiter) wants to show an object to another worker (observer). If the exhibiter is aware of the visual field of the observer, the exhibiter can show the object to the observer for certain. In addition, an effective way of exhibiting, e.g., a part of the object to be emphasized is directed to the observer when the object is shown, can easily be realized. If the observer is an elderly who is difficult to change the visual field by himself/herself, the exhibiter who is exhibiting the object can carry the object to the observer's visual field and show the object to the observer. To date, however, in order to grasp the observer's visual field, it is necessary for the exhibiter to predict the observer's visual field by visually identifying the external state of the observer and the position/orientation of an image sensing apparatus or the like used in observation.

According to the disclosure of Japanese Patent Application Laid-Open (KOKAI) No. 2000-353248, when a HMD for displaying mixed reality space is worn, the direction of observer's visual line is detected and indicated in the image of the exhibiter's mixed reality space. More specifically, a virtual object representing the direction of the observer's visual line is superimposed at the location of the observer's head wearing the HMD in the image which is sensed from the exhibiter's view point in the direction of the observer's existence.

However, the information obtained by the method disclosed in Japanese Patent Application Laid-Open (KOKAI) No. 2000-353248 is only the data regarding the direction of visual line, and does not clearly tells the exhibiter the visual field of the observer.

Furthermore, there is another problem in the system which performs clipping in a rendered virtual object. Clipping is performed in the following case. For instance, if an object is exhibited off the area between the front clipping surface 302 and the rear clipping surface 303 of the view volume 101 shown in FIG. 3, virtual data of the exhibited object is not displayed (rendered) even if the object is within the visual field. In this system, if the object is exhibited, for instance, behind the rear clipping surface 303, virtual data of this object is not displayed even though the object exists within the observer's visual field. However, the exhibiter is unable to determine such situation based only on the indication of the aforementioned virtual object which represents the direction of the observer's visual line.

SUMMARY OF THE INVENTION

The present invention has been proposed in view of the above-described problems. The object of the present invention is, in a mixed reality exhibiting system, for an observer who is in mixed reality space to precisely grasp a visual field of another observer who observes the mixed reality space.

More specifically, the present invention is aimed to exhibit a view volume area, which is three-dimensional visual field space of an observer, in a visual field observed by an exhibiter by using CG or the like so that the exhibiter can recognize the view volume area of the observer for certain.

In order to attain the above object, the image exhibiting method of exhibiting an image of mixed reality space, according to one aspect of the present invention includes: a calculating step of calculating a three-dimensional visual-field area of an observer in the mixed reality space; a generating step of generating a virtual visual-field object representing the visual-field area; and a superimposing step of superimposing the virtual visual-field object on the image of the mixed reality space to be exhibited.

Furthermore, in order to attain the above object, the image exhibiting apparatus for exhibiting an image of mixed reality space, according to another aspect of the present invention comprises: a calculating unit for calculating a three-dimensional visual-field area of an observer in the mixed reality space; a generating unit for generating a virtual visual-field object representing the visual-field area; and a superimposing unit for superimposing the virtual visual-field object on the image of the mixed reality space to be exhibited.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

The description of the following embodiments will be provided on a visual-field area exhibiting apparatus and a visual-field area exhibiting method, in which the present invention is applied to a mixed reality system employing a video see-through HMD. Note that the present invention is not only applicable to a mixed reality system employing a video see-through HMD, but also applicable to a method of any combination of the aforementioned three exhibiting methods: an exhibiting method using the HMD; an exhibiting method by setting a display device near an observer; and an exhibiting method by changing a displayed image based on motion of the observer's body; and the two observing methods: the optical see-through method and the video see-through method.

In the following embodiments, a mixed reality system means a system that exhibits mixed reality space, where an image of reality space and an image of non-reality space (virtual space) such as CG are synthesized, to a user. Note that information regarding the mixed reality technique can be obtained from, e.g., "Mixed Reality: Future dreams seen at the border between real and virtual worlds," H. Tamura, H. Yamamoto and A. Katayama, Computer Graphics and Applications, vol. 21, no. 6, pp. 64-70, 2001 (hereinafter referred to as Document 1).

First Embodiment

The first embodiment describes a visual-field area exhibiting apparatus and method, utilized in a case where two workers each wearing a video see-through HMD perform cooperative work and share mixed reality space, and one of the workers exhibits the other worker a real object on which virtual data is superimposed.

Figure 1:
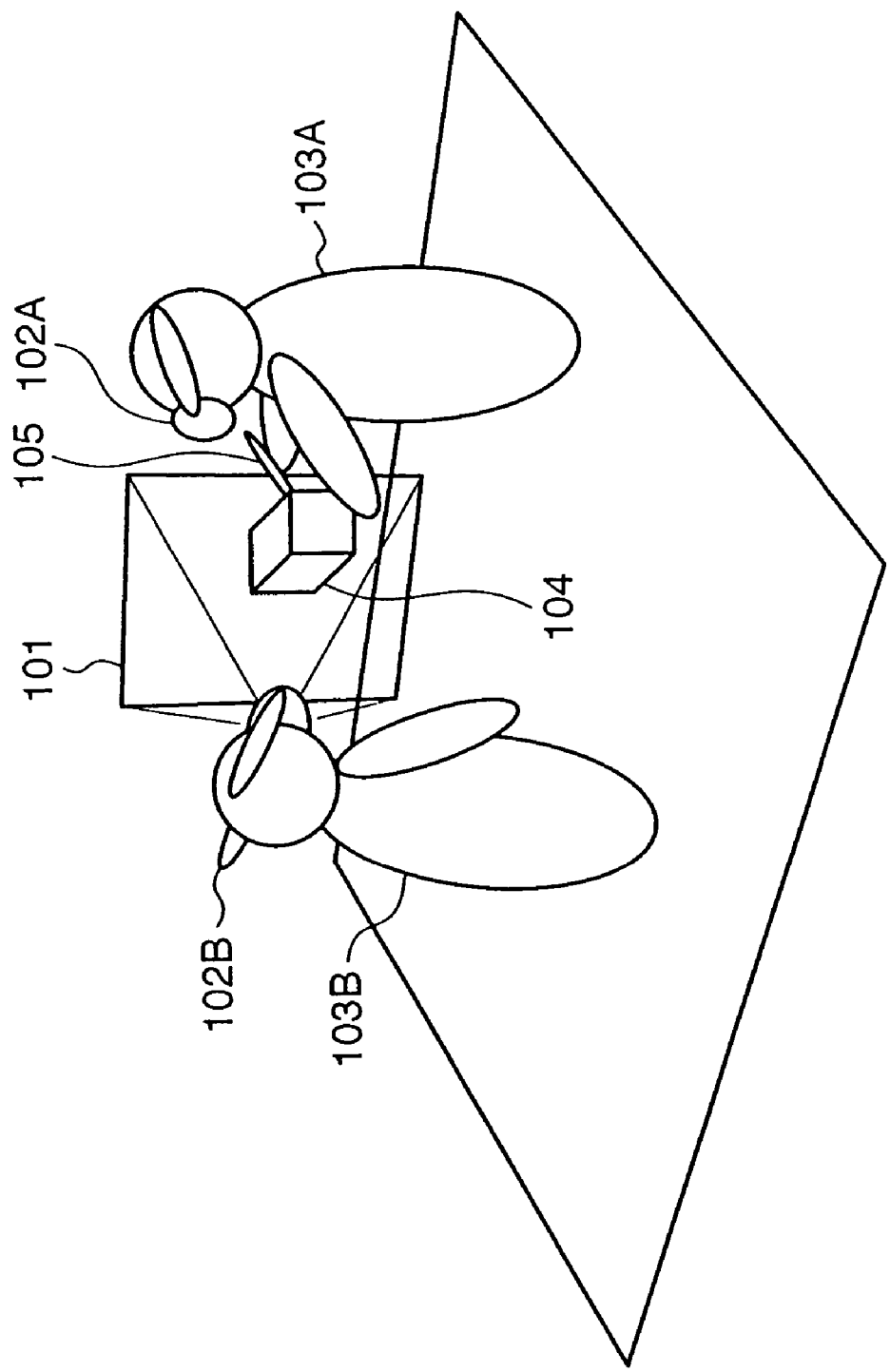
FIG. 1 is a schematic view for explaining an external appearance of a mixed reality exhibiting system in operation according to the first embodiment.

FIG. 1 is a schematic view for explaining an external appearance of the first embodiment in operation, to which the present invention is applied. Numeral 103A denotes a worker (hereinafter referred to as a exhibiter) who exhibits an object (hereinafter referred to as an exhibited object); and 103B, a worker (hereinafter referred to as an observer) who observes the exhibited object. The exhibiter 103A and the observer 103B share mixed reality space through respective video see-through HMDs 102A and 102B. The video see-through HMDs 102A and 102B in the first embodiment are a monocular video see-through HMD having one image sensing unit (not shown in FIG. 1). According to the present invention, the display devices, e.g., HMD, of the exhibiter 103A and the observer 103B for exhibiting mixed reality do not necessarily adopt the same method. The present invention is applicable to a case where mixed reality space is shared by display devices adopting different methods.

Numeral 104 denotes an exhibited object exhibited by the exhibiter 103A to the observer 103B. The first embodiment assumes that the exhibited object is a rectangular parallelepiped model (real object). On the image of the rectangular parallelepiped, virtual data is superimposed and displayed in the HMDs 102A and 102B of the exhibiter 103A and observer 103B. Numeral 105 denotes a pointing stick. In this example, the exhibiter 103A holds the pointing stick 105 in hand to show the observer 103B the point of interest on the exhibited object 104. Note that the first embodiment uses the pointing stick 105 only for designating the point of interest without tracking the position/orientation of the pointing stick 105. Needless to say, the pointing stick 105 may be used for interaction with a virtual object, such as inputting a tracked position/orientation of the pointing stick 105 to the apparatus and changing the position of the virtual object superimposed on the exhibited object 104.

Numeral 101 denotes a virtual object (hereinafter referred to as a visual-field object) which indicates the view volume and visual field of the observer 103B. The shape of the visual-field object 101 is determined by a parameter, e.g., a visual field angle of the HMD 102B worn by the observer 103B, a parameter of the clipping plane of the virtual space image generating device, and the like. In the first embodiment, the shape of the visual-field object 101 is determined by internal parameters of the image sensing unit fixed to the HMD 102B, a distance from a view point 301 to the front clipping surface 302 shown in FIG. 3 which will be described later, and a distance from the view point 301 to the rear clipping surface 303. Furthermore, in the first embodiment, the visual-field object 101 is displayed only in the HMD 102A worn by the exhibiter 103A and not displayed in the HMD 102B of the observer 103B. The reason that the visual-field object 101 is not displayed for the observer 103B is to prevent any influence on the observer's observation of the exhibited object 104. The visual-field object 101 is displayed in half transparent because there is a case that the visual-field object 101 is superimposed on the exhibited object 104. It should be apparent that the visual-field object 101 is not limited to be displayed in half transparent, but may be displayed in other form of expression, e.g., wire frame or the like.

Figure 2:
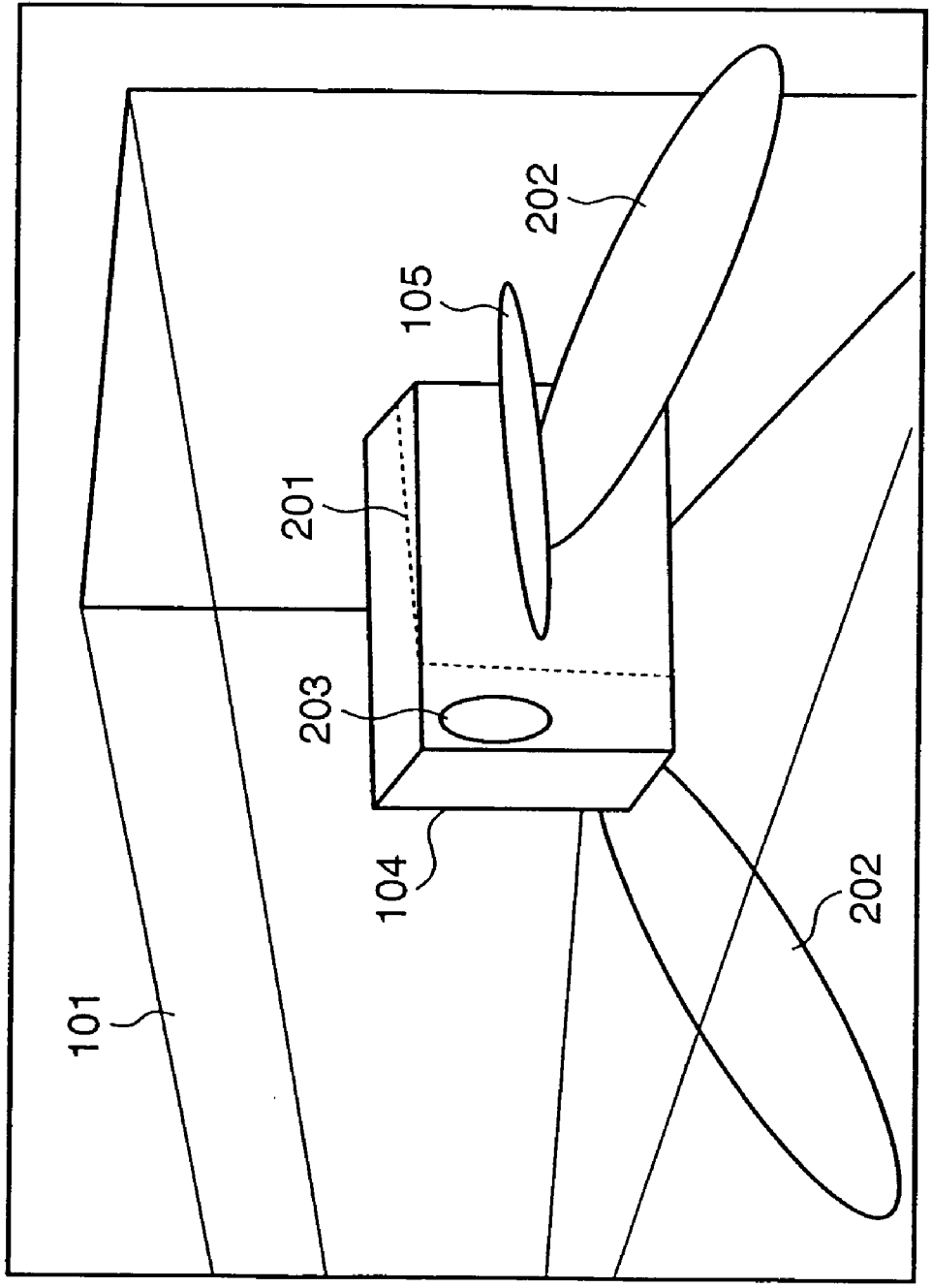
FIG. 2 is an explanatory view of an exhibited image displayed on a HMD of an exhibiter 103A.

FIG. 2 is an explanatory view of an exhibited image displayed on the HMD 102A of the exhibiter 103A. Numeral 202 denotes arms of the exhibiter 103A, which are sensed and displayed. The left hand holds the exhibited object 104 and the right hand holds the pointing stick 105. Numeral 203 denotes a region of interest, to which the exhibiter 103A wants to draw particular attention of the observer 103B. Numeral 201 denotes a virtual object (hereinafter referred to as a boundary object) which indicates a boundary between the exhibited object 104 and visual-field object 101. By virtue of the boundary object 201, the exhibiter 103A is able to visually recognize that which region of the exhibited object 104 is displayed and which region is not displayed in the image of the mixed reality space displayed in the HMD 102B of the observer 103B. For instance, by superimposing the boundary object 201 on the exhibited object 104, the exhibiter 103A is able to visually recognize whether or not the region of interest 203 falls within the visual field of the observer 103B. Note, in the first embodiment, the boundary object 201 is configured with a segment representing a boundary surface between the exhibited object 104 and the visual-field object 101.

Figure 3:
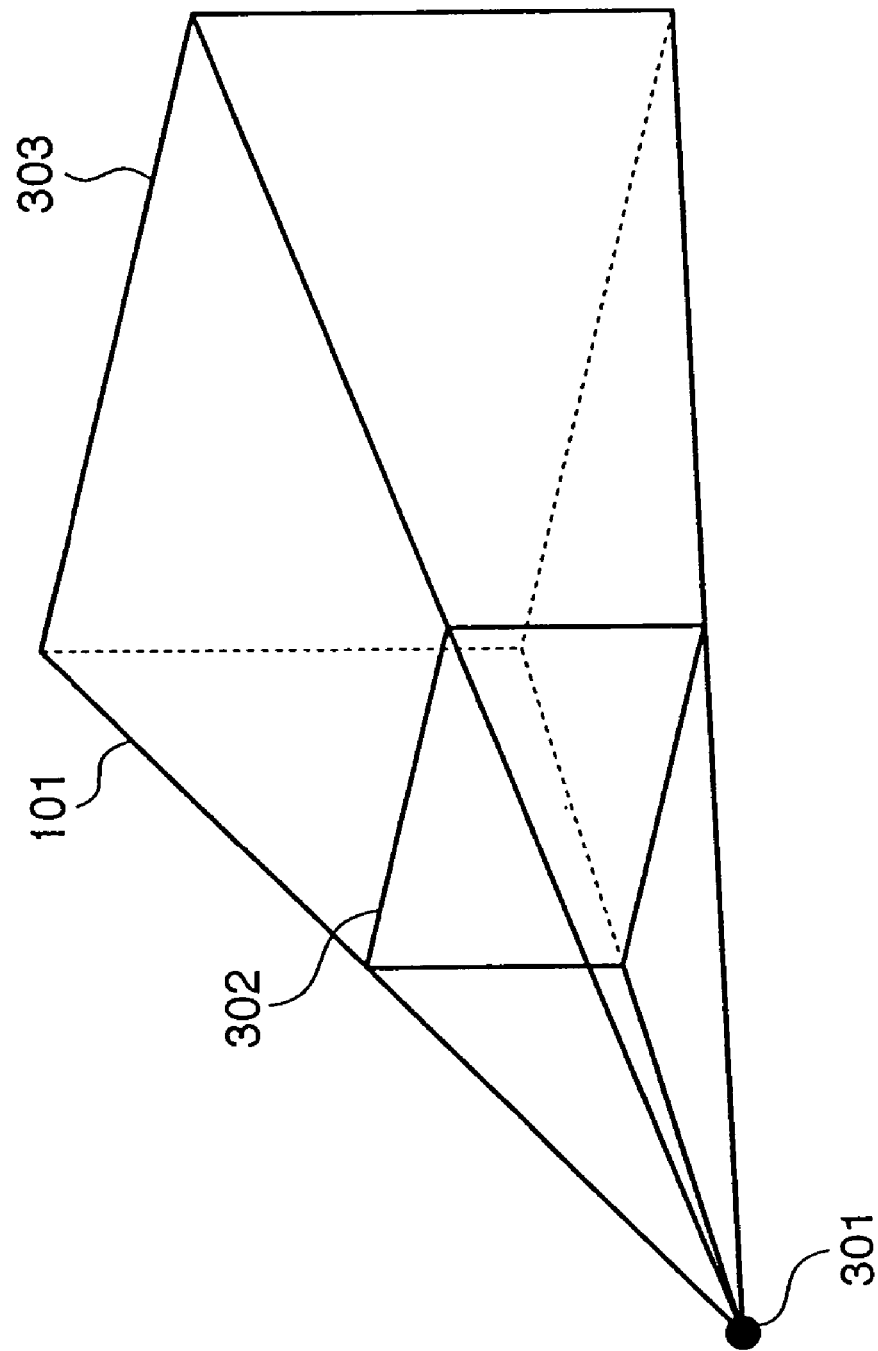
FIG. 3 is a schematic view for explaining the shape of a visual-field object.

FIG. 3 is a schematic view for explaining the shape of the visual-field object. Numeral 301 denotes a view point of the image sensing unit fixed to the HMD 102B. The shape of the quadrangular pyramid indicative of the visual field is determined by the view point 301 and camera's internal parameters. The camera's internal parameters are a focal length $L_c$ of the image sensing unit, a projection plane horizontal resolution R, a position of principal point P ($P_x$, $P_y$), and an aspect ratio A of the projection plane. With the camera's internal parameters, an area representing the visual field is obtained. The area representing the visual field (visual-field area) is a region that surrounds a visual axis with the view point 301 and four planes (planes that are parallel to the four slopes of the quadrangular pyramid in FIG. 3) passing through respective sides of projection planes (not shown). Numerals 302 and 303 respectively denote a front clipping surface and a rear clipping surface. In the apparatus generating a virtual space image, only a virtual object that falls within the region (view volume) surrounded by the aforementioned visual-field area, front clipping surface and rear clipping surface is rendered. Based on the region, the shape of the visual-field object 101 is determined as follows:

$$l = -P_x \cdot \frac{L_N}{L_c} \quad (1)$$

$$r = (R - P_x) \cdot \frac{L_N}{L_c} \quad (2)$$

$$t = P_y \cdot \frac{L_N}{L_c \cdot A} \quad (3)$$

$$b = -(R \cdot A - P_y) \cdot \frac{L_N}{L_c \cdot A} \quad (4)$$

The parameters l, r, t and b in the equation (1) to (4) indicate the respective positions of the left side, right side, top side, and bottom side of the front clipping surface, and $L_N$ indicates a distance from the view point 301 to the front clipping surface 302. The positions of the left side, right side, top side, and bottom side of the rear clipping surface are determined by the line of intersection between the rear clipping surface (the surface automatically determined by a distance to the rear clipping surface) and four planes formed by l, r, t, b and the view point 301.

Figure 4:
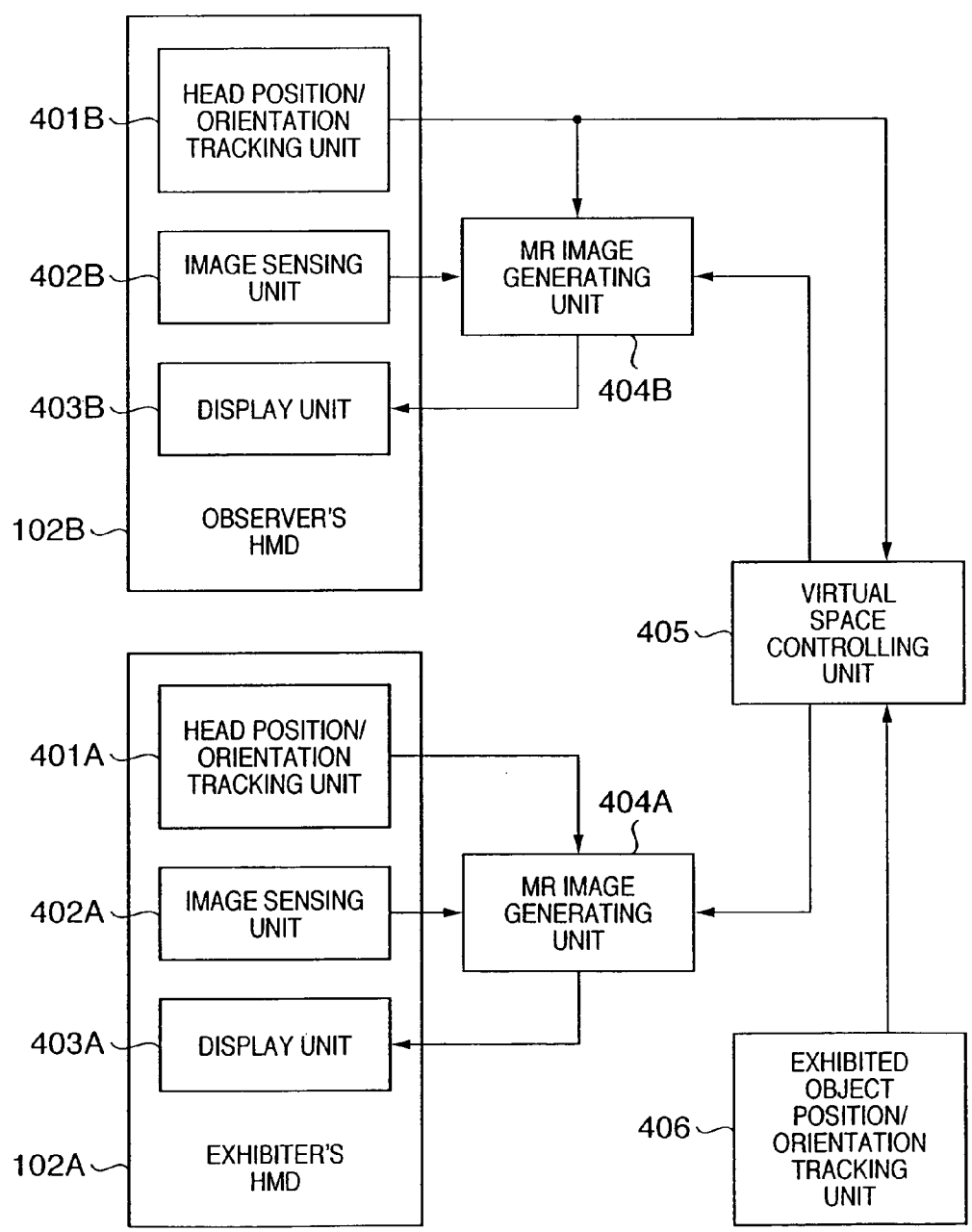
FIG. 4 is a block diagram showing a construction of a visual-field area exhibiting apparatus according to the first embodiment.

FIG. 4 is a block diagram showing a construction of a visual-field area exhibiting apparatus according to the first embodiment. The exhibiter's HMD 102A and the observer's HMD 102B, having the same construction, respectively comprise a head position/orientation tracking unit 401A (401B), an image sensing unit 402A (402B), and a display unit 403A (403B).

In the first embodiment, the head position/orientation tracking unit 401A (401B) employs a magnetic sensor 3SPCACE FASTRAK (registered trademark) provided by Polhemus, Inc. In the FASTRAK sensor, a receiver (not shown) receives a magnetic field generated by a transmitter, and a controller (not shown) of the FASTRAK sensor which is connected to the receiver outputs the position and orientation of the receiver. The receiver, fixed to the HMD 102A (102B), measures the position/orientation of the head unit. The image sensing unit 402A (402B) and display unit 403A (403B) are incorporated in the HMD 102A (102B) in the first embodiment, and provided so that the optical system of the display unit matches the image sensing system of the image sensing unit.

The HMD having the aforementioned configuration is disclosed in "Development of a stereo video see-through HMD for AR systems," A. Takagi, S. Yamazaki, Y. Saito, and N. Taniguchi, ISAR2000, pp. 68-77, 2000 (hereinafter referred to as Document 2). Note, in the monocular HMD employed in the first embodiment, assume that an image obtained from the image sensing unit of one eye is rendered in the display unit of both eyes.

The MR image generating units 404A and 404B generate an image of mixed reality space (hereinafter referred to as a MR image) to be provided to the exhibiter 103A and observer 103B. The MR image generating units 404A and 404B, having the same construction, receive input data from the head position/orientation tracking units 401A and 401B as well as the image sensing units 402A and 402B respectively, generate a mixed reality image that matches the respective head positions/orientations, and display the mixed reality image in the display units 403A and 403B.

An exhibited object position/orientation tracking unit 406 measures the position/orientation of the exhibited object 104 held by the exhibiter 103A. In the first embodiment, a magnetic sensor 3SPCACE FASTRAK (registered trademark) provided by Polhemus, Inc. is employed as similar to the head position/orientation tracking units 401A and 401B. A receiver (not shown) of the FASTRAK sensor is fixed to the exhibited object 104.

A virtual space controlling unit 405 controls virtual object data which is shared by the exhibiter 103A and observer 103B and which is used for a MR image. Virtual object data is configured with, for instance, a vertex property of a virtual object and a texture image. In the vertex property, three-dimensional coordinate values of the vertex, a virtual object ID that the vertex belongs to, a texture coordinate value or the like are described. The virtual space controlling unit 405 has a function to generate the visual-field object 101 in the reality space based on an output from the head position/orientation tracking unit 401B, a function to generate the boundary object 201 indicative of a boundary between the visual-field object 101 and the exhibited object 104 based on an output from the exhibited object position/orientation tracking unit 406, and a function to deliver appropriate virtual object data to the MR image generating units 404A and 404B, in addition to a function to store data of a shared virtual object. In the initial state, the virtual space controlling unit 405 stores data indicative of the shape of the exhibited object 104, data of a virtual object to be superimposed on the exhibited object 104, and the like.

The aforementioned MR image generating units 404A and 404B as well as the virtual space controlling unit 405 are constructed by a personal computer or the like.

As a method of sharing mixed reality space by plural persons, the above-described system adopts a method in which virtual object data is consolidated by the virtual space controlling unit 405. However, the present invention is not limited to this. The present invention can adopt any method that can appropriately share mixed reality space, e.g., a method in which virtual data is stored in each apparatus of the observer and the exhibiter, and only difference data is transmitted for sharing mixed reality space.

Figure 5:
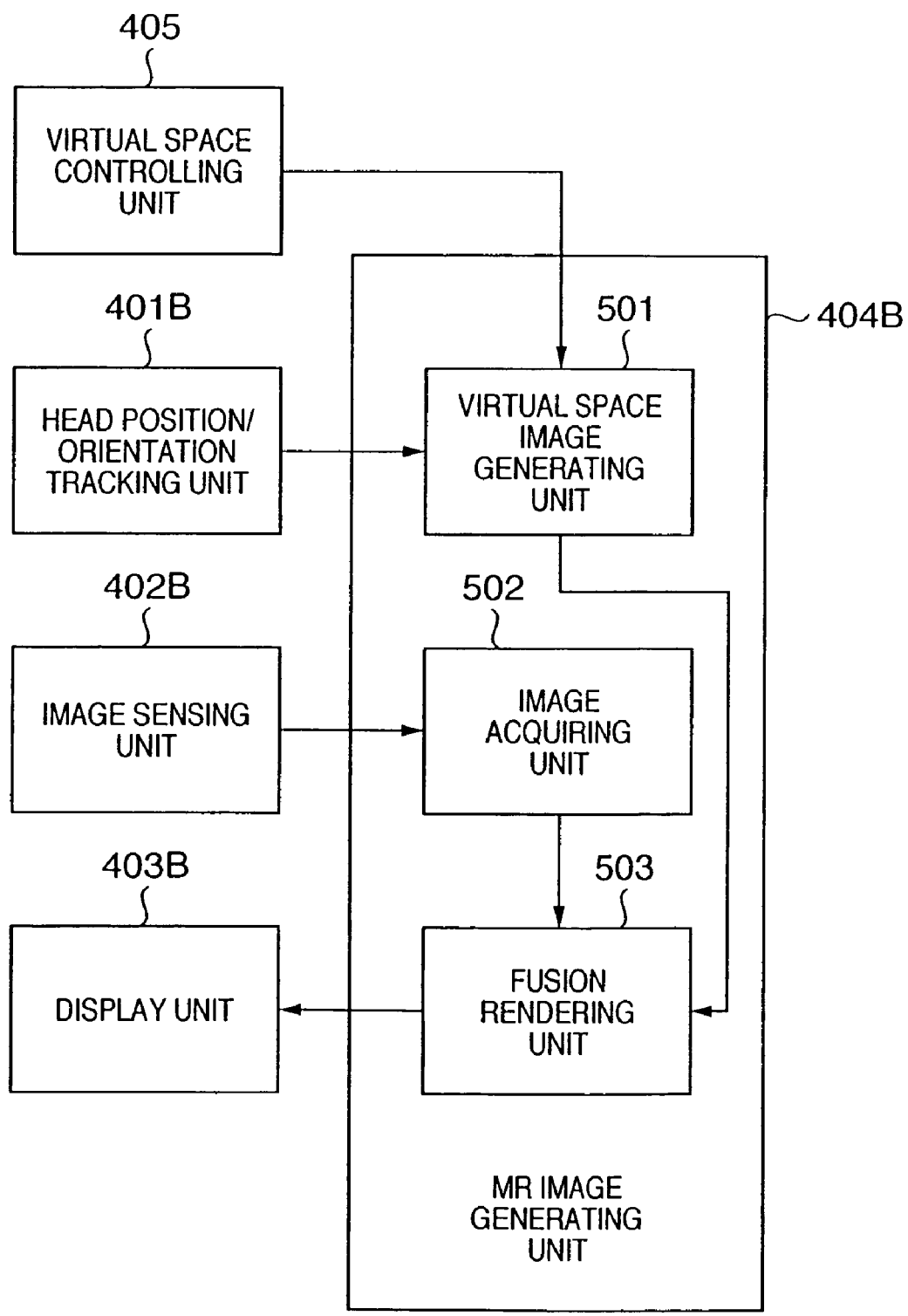
FIG. 5 is a block diagram showing a construction of a MR image generating unit.

FIG. 5 is a block diagram showing a construction of the MR image generating unit 404B. A virtual space image generating unit 501 acquires a viewing conversion matrix Mc, indicative of a camera position/orientation in the reference coordinate system, from the head position/orientation tracking unit 401B which measures the head position/orientation of the observer 103B. Among the virtual object data delivered from the virtual space controlling unit 405, vertices V that construct the virtual object and the viewing conversion matrix Mc are integrated, thereby calculating vertices V' of the virtual object in the camera coordinate system.

$$V' = Mc \cdot V \quad (5)$$

Then, it is determined whether or not V' falls within the region of the view volume, and clipping is performed. It is so set that, by clipping processing, only a virtual object that exists within the view volume is rendered. The first embodiment employs the function of OpenGL, which is a three-dimensional CG rendering library, for rendering virtual space including clipping. Note that the present invention is not limited to the use of OpenGL for rendering virtual space, but any means capable of rendering a desired virtual object is applicable. Ultimately, a virtual space image is generated based on the vertex data of the virtual object, texture coordinate data, and texture image data. The generated virtual space image is outputted to a fusion rendering unit 503.

An image acquiring unit 502 acquires an image of reality space, sensed by the image sensing unit 402B incorporated in the observer's HMD 102B, and stores the image. The fusion rendering unit 503 superimposes the image, generated by the virtual space image generating unit 501, on the sensed reality space image stored by the image acquiring unit 502, thereby generating a MR image. By displaying the MR image in the display unit 403B of the observer's HMD 102B, appropriate MR space can be exhibited to the observer 103B. Note, since the MR image generating unit 404A which generates a MR image to be exhibited to the exhibiter 103A has the same construction and the same function as that of the MR image generating unit 404B, a detailed description thereof is omitted.

Figure 6:
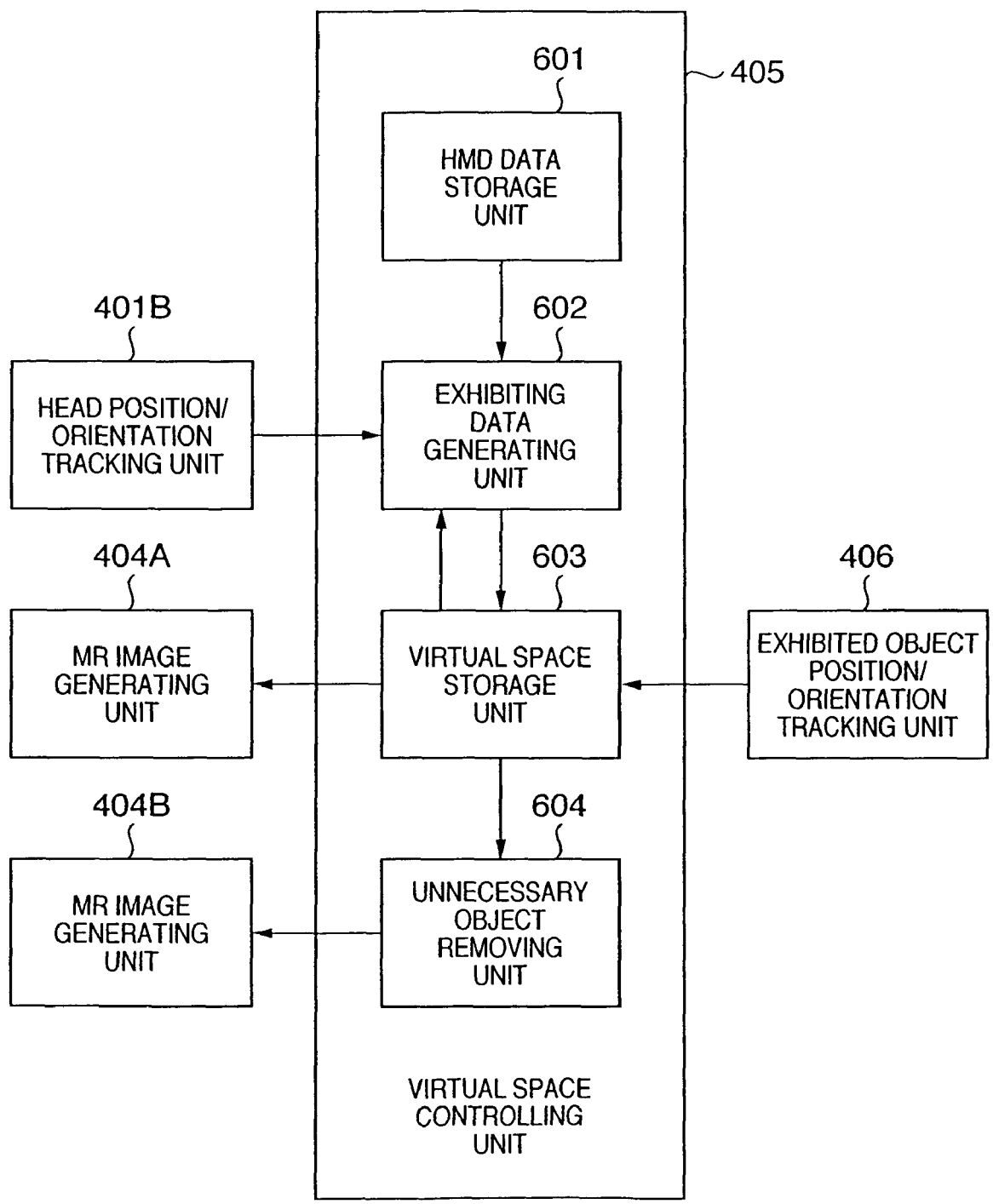
FIG. 6 is a block diagram showing a construction of a virtual space controlling unit.

FIG. 6 is a block diagram showing a construction of the virtual space controlling unit 405. A HMD data storage unit 601 stores camera's internal parameter data of the observer's HMD 102B connected to the virtual space controlling unit 405, a distance from the view point 301 to the front clipping surface 302, and a distance from the view point 301 to the rear clipping surface 303. Based on the data stored in the HMD data storage unit 601 and the head position/orientation data of the observer 103B outputted by the head position/orientation tracking unit 401B, an exhibiting data generating unit 602 generates the visual-field object 101, which is a frustum of quadrangular pyramid shown in FIG. 3, on the reference coordinate system. Furthermore, the exhibiting data generating unit 602 generates the boundary object 201 based on the visual-field object 101, and the shape and position/orientation data of the exhibited object 104.

Note that the position/orientation data of the exhibited object 104 and the shape data of the exhibited object 104 (including constitutive data of the polygon surfaces) are inputted from a virtual space storage unit 603. The boundary object 201 is configured with plural segments, which are determined by the line of intersection between the six surfaces constituting the visual-field object (front clipping surface 302, rear clipping surface 303, and four side surfaces of the quadrangular pyramid) and the polygon surfaces constituting the exhibited object 104. The visual-field object 101 is stored as three-dimensional coordinate values of eight vertices of the frustum of quadrangular pyramid that forms the area. The boundary object 201 is divided into segments, and three-dimensional coordinate values of two vertices are stored for each of the segments.

The virtual space storage unit 603 stores virtual object data such as the aforementioned vertex data of a virtual object, a texture image, and the like. Furthermore, the virtual space storage unit 603 has a function to deliver the virtual object data to the MR image generating unit (e.g., 404A). For instance, the virtual space storage unit 603 delivers the visual-field object and boundary object generated by the exhibiting data generating unit 602 to the MR image generating unit 404A. Furthermore, based on an external input of vertex data of the virtual space data, the virtual space storage unit 603 has a function to change the position/orientation of the exhibited object. For instance, the virtual space storage unit 603 is used to receive input data from the exhibited object position/orientation tracking unit 406 and update the position/orientation of the shape data of the exhibited object 104.

An unnecessary object removing unit 604 removes the visual-field object 101 and the boundary object 201, which are unnecessary virtual objects for the observer 103B, from the virtual object data that is delivered from the virtual space storage unit 603 to the MR image generating unit 404B. By removing unnecessary virtual object data from the delivering data, the observer can concentrate on the exhibited object such as the exhibited object 104 in the mixed reality space. Further, by removing the virtual object, a load imposed on the rendering processing of the MR image generating unit 404B is reduced.

Figure 7:
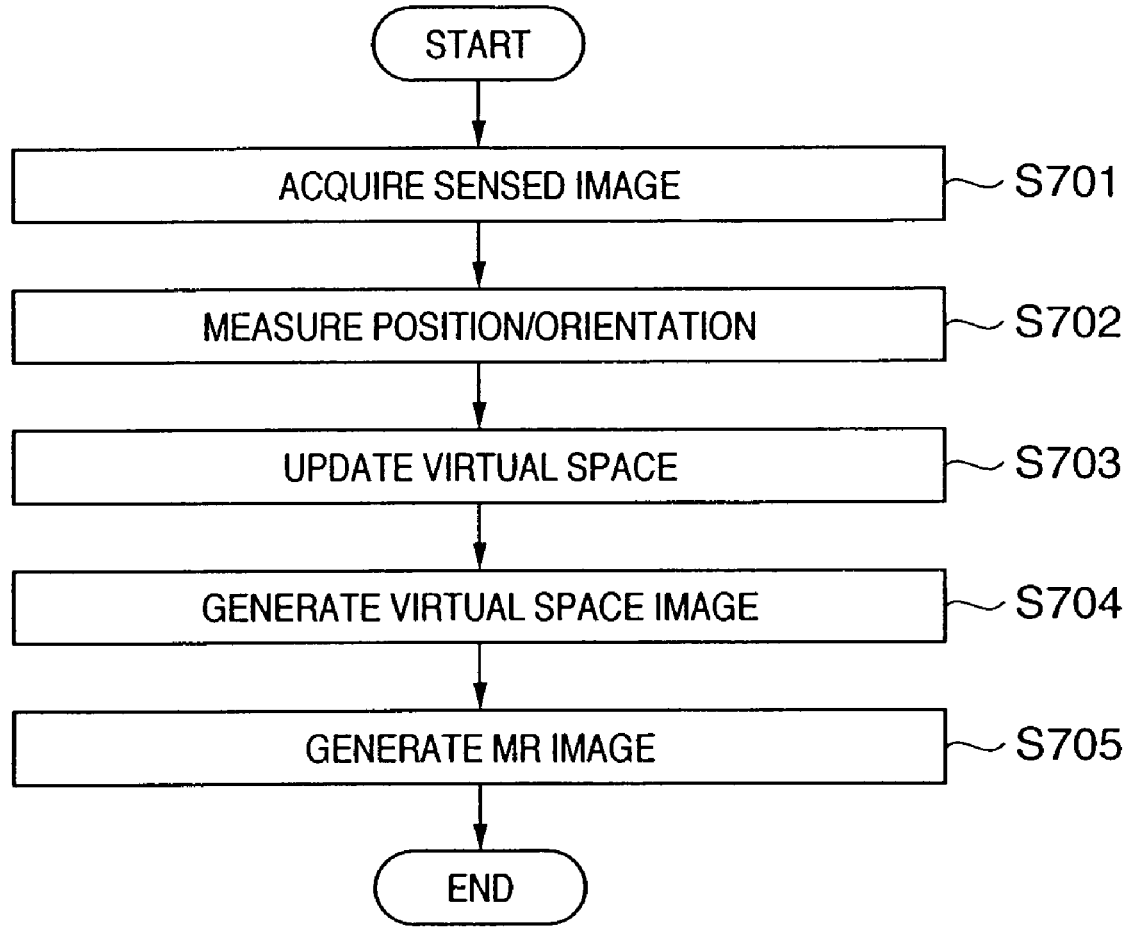
FIG. 7 is a flowchart describing processing of the visual-field area exhibiting apparatus according to the first embodiment.

FIG. 7 is a flowchart describing processing of the visual-field area exhibiting apparatus according to the first embodiment. In step S701, the image sensing units 402A and 402B incorporated respectively in the exhibiter's HMD 102A and the observer's HMD 102B acquire an image. In step S702, the position/orientation of each measuring target is acquired using the head position/orientation tracking units 401A and 401B, and the exhibited object position/orientation tracking unit 406. In step S703, the virtual space controlling unit 405 updates the virtual space data based on the measurement result in step S702. The processing of the virtual space controlling unit 405 will be described later in detail with reference to FIG. 8. In step S704, the virtual space image generating unit 501 of the MR image generating units 404A and 404B generates a virtual space image corresponding to the position/orientation of the HMDs 102A and 102B based on the virtual space data delivered by the virtual space controlling unit 405. In step S705, the fusion rendering unit 503 synthesizes the sensed image of the reality space obtained by the image acquiring unit 502 with the virtual space image generated by the virtual space image generating unit 501, and generates a MR image, then the MR image is displayed in the display units 403A and 403B of the respective HMDs.

Figure 8:
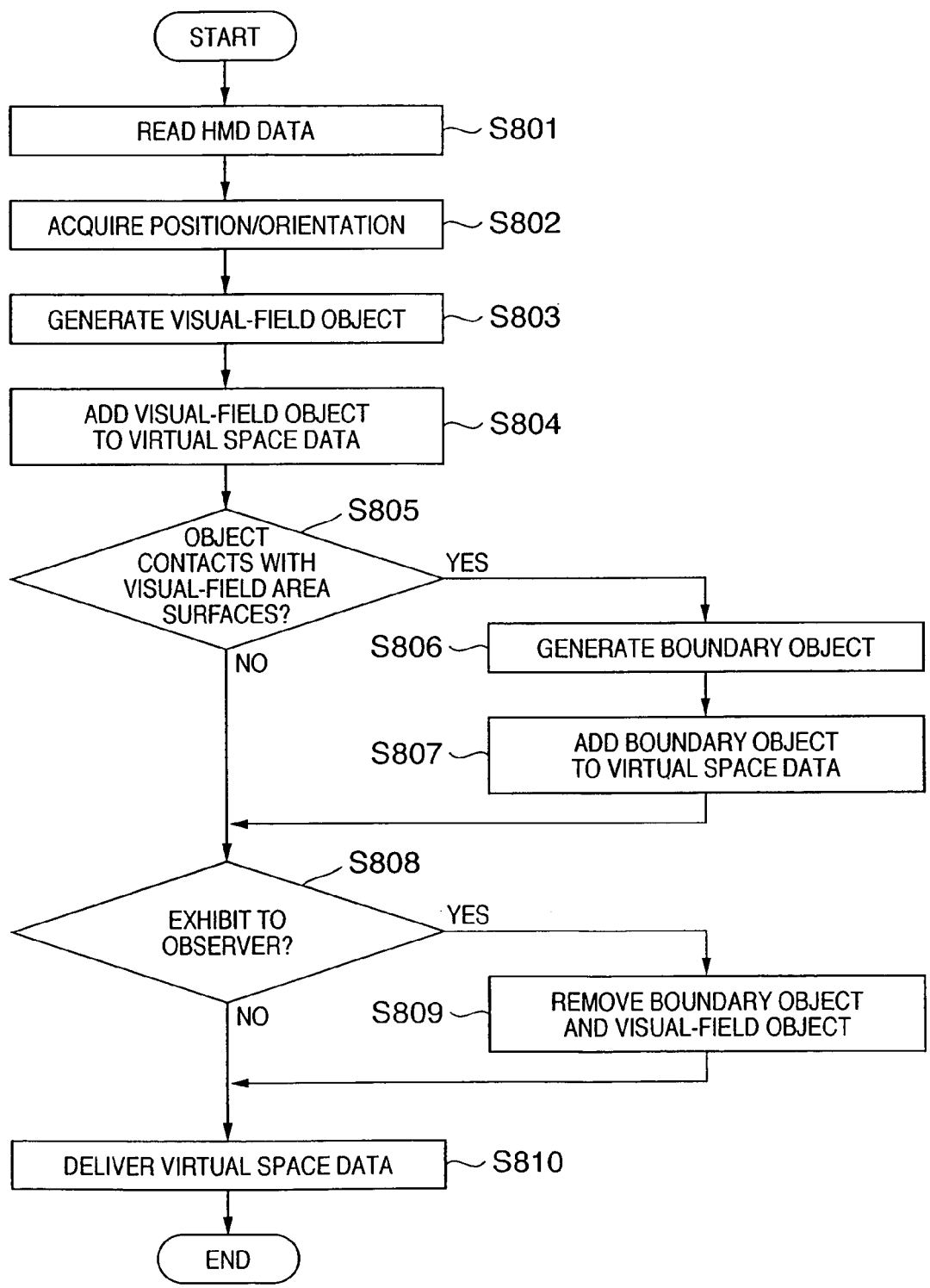
FIG. 8 is a flowchart describing processing of the virtual space controlling unit.

FIG. 8 is a flowchart describing processing of the virtual space controlling unit 405. In step S801, data of the observer's HMD 102B is read out of the HMD data storage unit 601 and inputted to the exhibiting data generating unit 602. In step S802, the exhibiting data generating unit 602 acquires head position/orientation data of the observer from the head position/orientation tracking unit 401B, and the virtual space storage unit 603 acquires the position/orientation of the exhibited object 104 from the exhibited object position/orientation tracking unit 406. Herein, the virtual space storage unit 603 updates the position/orientation of the exhibited object 104. In step S803, the exhibiting data generating unit 602 determines the shape and position/orientation of the visual-field object 101 based on the observer's head position/orientation and the HMD data stored in the HMD data storage unit 601. In step S804, the visual-field object 101 generated in step S803 is added to the virtual space storage unit 603.

In step S805, it is determined whether or not the exhibited object 104 comes in contact with the six surfaces constituting the visual-field object 101. If it does not contact with the six surfaces, the control proceeds to step S808; whereas if it contacts with the six surfaces, the control proceeds to step S806. In step S806, the exhibiting data generating unit 602 obtains the line of intersection of the contacting surface based on the shape data of the visual-field object 101 and the shape data of the exhibited object 104, and generates the boundary object 201. In step S807, the boundary object 201 generated in step S806 is added to the virtual space storage unit 603.

In step S808, it is determined whether the delivery destination of the virtual space data is the MR image generating unit of the observer 103B or the MR image generating unit of the exhibiter 103A. When the delivery destination is the MR image generating unit of the exhibiter 103A, the control proceeds to step S810 where the virtual space data is delivered to the MR image generating unit of the exhibiter 103A, and the control ends. Meanwhile, when the delivery destination is the MR image generating unit 404B of the observer 103B, the control proceeds to step S809. In step S809, the unnecessary object removing unit 604 removes the visual-field object 101 and the boundary object 201, which are unnecessary virtual space data for the observer 103B, from the virtual space data. Then, the control proceeds to step S810. The virtual space data, from which the unnecessary object is removed, is delivered to the MR image generating unit of the observer 103B, and the control ends.

As described above, by having the visual-field area exhibiting apparatus according to the first embodiment perform the above-described processing, MR images corresponding to the respective head positions and orientations are exhibited in the HMDs of the observer 103B and exhibiter 103A, and the observer 103B and the exhibiter 103A can recognize mixed reality space. Furthermore, the exhibiter 103A can not only recognize the mixed reality, but also visually recognize the visual-field object 101 representing the area observed by the observer 103B, i.e., the view volume.

Second Embodiment

In the above-described first embodiment, the exhibiter's HMD 102A and the observer's HMD 102B are a monocular HMD having a single image sensing unit. The second embodiment describes a visual-field area exhibiting apparatus in which at least the observer's HMD 102B is a binocular HMD (stereo HMD) having two image sensing units. Note that details of the stereo video see-through HMD 103B used in the second embodiment are described in the aforementioned Document 2.

Figure 9:
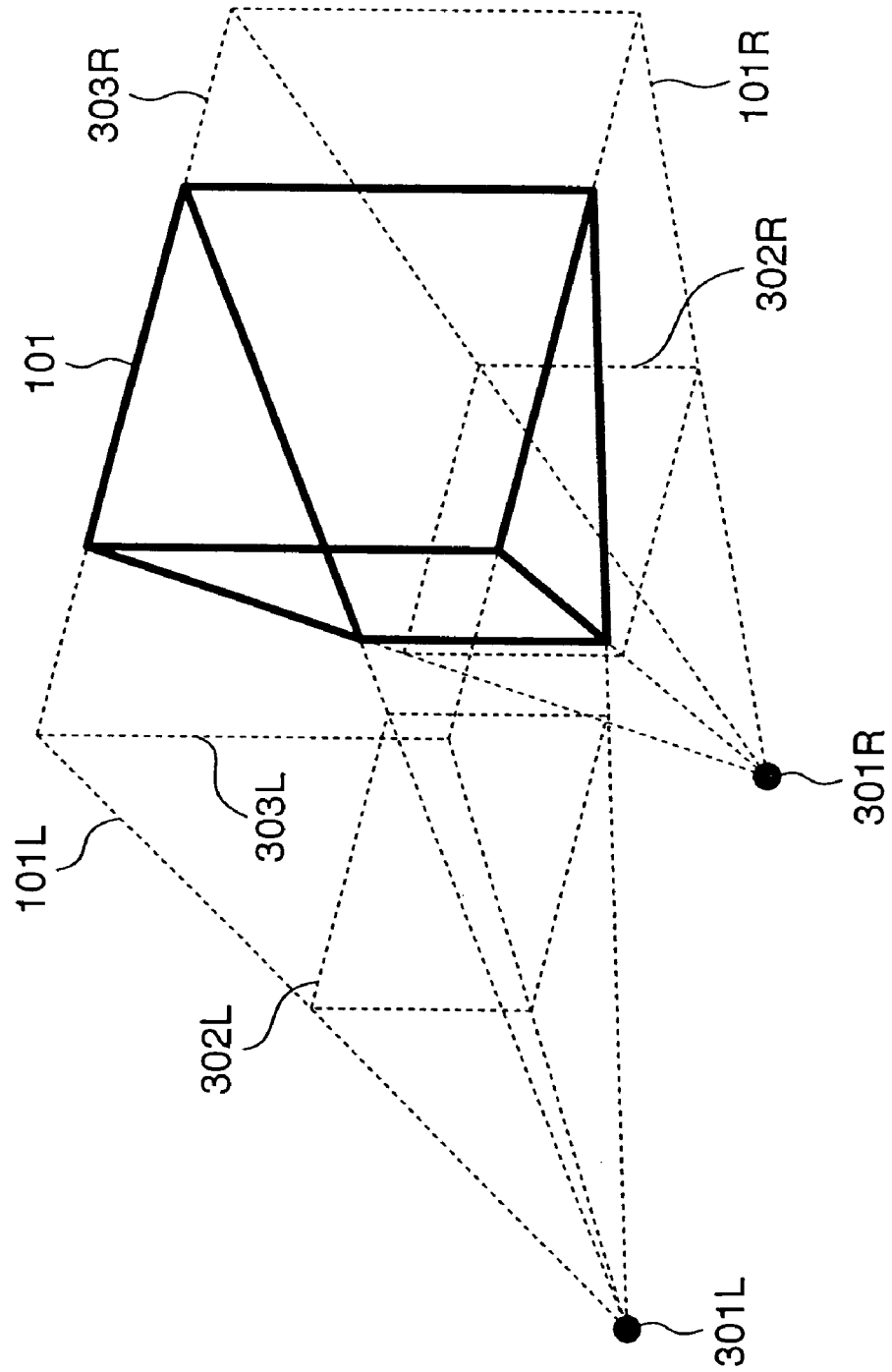
FIG. 9 is a schematic view for explaining the shape of a visual-field object according to the second embodiment.

FIG. 9 is a schematic view for explaining the shape of the visual-field object 101 according to the second embodiment. As described in the first embodiment, in a case of the monocular HMD, the view volume area is formed with one frustum of quadrangular pyramid. In a case of the stereo HMD, since an image is stereoscopically sensed, the view volume area is formed with two frusta of quadrangular pyramids 101L and 101R respectively having view points 301L and 301R as the vertices. The front clipping surfaces 302L and 302R as well as the rear clipping surfaces 303L and 303R are set in the respective view volume areas. In the stereo video see-through HMD 103B used in the second embodiment, the two view volume areas have a partially overlapping region. The overlapping region is the fusion-possible region where an observer can simultaneously observe an image with left and right eyes. When the exhibiter 103A exhibits the exhibited object 104, it is preferable to exhibit the object 104 in the fusion-possible region rather than to place it in the view volume areas 101L and 101R outside the fusion-possible region. Therefore, the shape of the visual-field object 101 according to the second embodiment adopts the fusion-possible region (area surrounded by the heavy line in FIG. 9).

Since the observer's HMD 102B of the second embodiment stereoscopically senses an image, assume that the image sensing unit 402B in FIG. 5 has two image sensing units. The two image sensing units are arranged so that the visual axis of the observer matches the visual axis of the camera, as stated in the aforementioned Document 2. The virtual space image generating unit 501 of the MR image generating unit 404B obtains the position and orientation of each image sensing device based on the head position/orientation of the observer which is obtained by the head position/orientation tracking unit 401B, and generates a virtual space image corresponding to each image sensing device. The fusion rendering unit 503 synthesizes the reality space images of the two image sensing devices acquired by the image acquisition unit 502 with the two virtual space images generated by the virtual space image generating unit 501, and displays the synthesized image in the display unit 403B.

The exhibiting data generating unit 602 in FIG. 6 determines the shape of the visual-field object 101 from the fusion-possible region as described above, and generates the parameters. In the second embodiment, the visual-field object has a shape indicated by numeral 101 in FIG. 9. Data indicative of six vertices of the visual-field object is stored in the virtual space storage unit 603.

As described above, according to the second embodiment, by virtue of employing a stereo video see-through HMD as the visual-field area exhibiting apparatus, the exhibiter 103A can visually recognize the fusion-possible region of the observer 103B, and the exhibiter 103A can place the exhibited object 104 with certainty at the position that can easily be observed by the observer 103B.

Third Embodiment

The first embodiment describes an example of a visual-field area exhibiting apparatus applying the present invention, where there is one observer and one exhibiter. However, the present invention does not limit the number of people of the observer and the exhibiter, and is applicable to a case where plural observers and plural exhibiters exist at the same time. The third embodiment describes a case where there is one exhibiter and two observers in the visual-field area exhibiting apparatus that is similar to the first embodiment.

Figure 10:
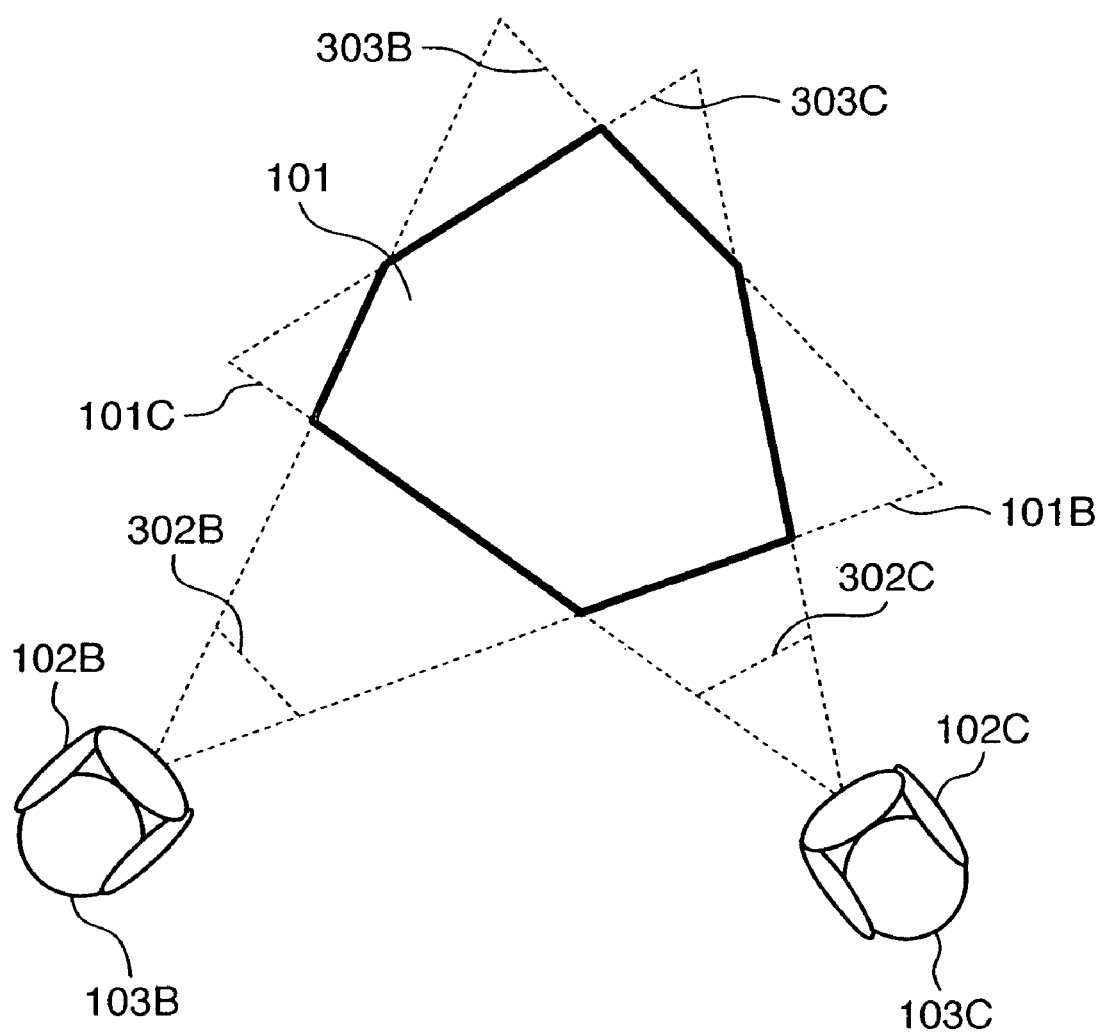
FIG. 10 is a schematic view for explaining the shape of a visual-field object according to the third embodiment.

Since there are two observers in the third embodiment, two visual-field areas are formed as shown in FIG. 10. To avoid a complicated diagram, a plan view is used in FIG. 10. The two observers are represented by numerals 103B and 103C. In the visual-field area exhibiting apparatus according to the third embodiment, an observer's HMD 102C and a MR image generating unit 404C are additionally included in the construction of the first embodiment shown in FIG. 4. These units are similarly connected as that of the observer's HMD 102B and MR image generating unit 404B. The internal constructions of the observer's HMD 102C and MR image generating unit 404C are the same as that of the observer's HMD 102B and MR image generating unit 404B.

The shape of the visual-field object 101 according to the third embodiment is described with reference to FIG. 10. When the exhibiter 103A exhibits the exhibited object 104 simultaneously to the observers 103B and 103C, it is preferable to move and exhibit the exhibited object 104 in the region where the view volumes of the two observers overlap. Therefore, the exhibiting data generating unit 602 of the virtual space controlling unit 405 generates, as the visual-field object 101, an object representing a region where the view volumes of the observers 103B and 103C overlap (hereinafter referred to as a view volume overlapping region). By adding the vertex data of the visual-field object to the virtual space storage unit 603 and delivering the data to the exhibiter 103A, the exhibiter 103A can visually recognize the area to show the exhibited object 104 simultaneously to the two observers 103B and 103C. Note that the numerals 302B and 303B are respectively the front clipping surface and the rear clipping surface set in the view volume 101B, and numerals 302C and 303C are respectively the front clipping surface and the rear clipping surface set in the view volume 101C.

In the third embodiment, the exhibiting data generating unit 602 generates only the visual-field object 101 representing the view volume overlapping region. However, depending on the setting, the exhibiting data generating unit 602 may individually generate the visual-field areas 101B and 101C of the observers 103B and 103C, and they may be simultaneously exhibited to the exhibiter 103A or individually exhibited by switching. By virtue of exhibiting the visual-field areas 101B and 101C of the respective observers 103B and 103C, in a case where the two observers are viewing different directions and there is no view volume overlapping region 101, the exhibiter 103A can grasp such situation. Note that the third embodiment assumes that the visual-field areas 101B and 101C as well as the view volume overlapping region 101 are rendered in a half-transparent property and displayed in different colors so that the respective areas are distinguishable. However, as mentioned above, the display property is not limited to this, but as long as the exhibiter 103A can recognize each visual-field area, any display property is applicable.

Furthermore, in the third embodiment, since the unnecessary object removing unit 604 of the virtual object controlling unit 405 removes the visual-field area 101B of the observer 103B immediately before it is delivered to the MR image generating unit 404B, the observer 103C cannot confirm the visual-field area 101B of the observer 103B. However, it is possible to perform setting so that the unnecessary object removing unit 604 delivers the visual-field area of the other observer without removing it and that the observer can confirm the visual-field area of the other observer.

Furthermore, it should be apparent that the worker who is using the visual-field area exhibiting apparatus as an observer can dynamically use this apparatus as an exhibiter by changing the setting. Vice versa, it should be apparent that the worker who is using the visual-field area exhibiting apparatus as an exhibiter can dynamically use this apparatus as an observer by changing the setting. Furthermore, in the above-described embodiments, although the view volume or the overlapping region of the two view volumes is displayed as the visual-field object, the "visual-field area" may be simultaneously displayed (in a way that it is distinguishable from the view volume).

Note, in the above-described first to third embodiments, setting the HMD as the observer's HMD or as the exhibiter's HMD is performed by the virtual space controlling unit 405. In a case where the virtual space controlling unit 405 is configured with a personal computer as mentioned above, a predetermined user interface is displayed on the computer screen to allow a user to perform arbitrary setting using a keyboard and a mouse.

As has been set forth above, according to the above-described embodiments, when mixed reality space is shared by plural persons, exhibiting a visual-field area of the other person can contribute to efficient cooperative work. For instance, assuming a case where one worker wants to exhibit an object to the other worker, it is possible to exhibit the object in the visual field of the other person for certain. In addition, an effective way of exhibiting, e.g., a part of the object to be emphasized is directed to the observer when the object is shown, can be realized.

Note that the object of the present invention can also be achieved by providing a storage medium storing program codes of a software for realizing the aforesaid functions of the embodiments to a computer system or apparatus, reading the program codes, by a CPU or MPU of the computer system or apparatus, from the storage medium, then executing the program.

In this case, the program codes read from the storage medium realize the functions according to the embodiments, and the storage medium storing the program codes constitutes the present invention.

Further, the storage medium, such as a flexible disk, hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or the entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or the entire processes in accordance with designations of the program codes and realizes functions of the above embodiments.

As has been set forth above, by virtue of the present invention, the visual field of an observer who observes mixed reality space can precisely be grasped by another observer who is in the mixed reality space.

For instance, a view volume area, which is three-dimensional visual field space of an observer, is displayed in an image observed by an exhibiter by using CG or the like so that the exhibiter can recognize the observer's view volume area for certain. As a result, an effective way of exhibiting, e.g., a part of the object to be emphasized is directed to the observer when the object is shown, can easily be realized.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2003-203939 filed on Jul. 30, 2003, which is hereby incorporated by reference herein.

What is claimed is:

1. An image exhibiting method of exhibiting an image of mixed reality space, comprising:
an acquisition step of acquiring a three-dimensional object corresponding to an observer image sensing unit, wherein the three-dimensional object indicates a three-dimensional shape of a visual-field area being sensed by the observer image sensing unit, and wherein positions of a front clipping surface and a rear clipping surface of the three-dimensional object with respect to a view point of the observer image sensing unit are determined based on an internal parameter of the observer image sensing unit;

a sensing step of sensing a real space by using an exhibiter image sensing unit;

a superimposing step of generating an image of mixed reality space by superimposing the three-dimensional object on an image of the real space obtained in said sensing step, based on position and orientation of the exhibiter image sensing unit; and a display step of displaying the image of mixed reality space on a display unit.

2. An image exhibiting apparatus for exhibiting an image of mixed reality space, comprising:

an acquisition unit for acquiring a three-dimensional object corresponding to an observer image sensing unit, wherein the three-dimensional object indicates a three-dimensional shape of a visual-field area being sensed by the observer image sensing unit, and wherein positions of a front clipping surface and a rear clipping surface of the three-dimensional object with respect to a view point of the observer image sensing unit are determined based on an internal parameter of the observer image sensing unit;

an exhibiter image sensing unit for sensing a real space;

a superimposing unit for (i) generating an image of mixed reality space by superimposing the three-dimensional object on an image of the real space obtained by said exhibiter image sensing unit; and a display unit for displaying the image of mixed reality space.

3. A computer readable medium storing a computer program for causing a computer execute an image exhibiting process of exhibiting an image of mixed reality space, said process comprising:

an acquisition step of acquiring a three-dimensional object corresponding to an observer image sensing unit, wherein the three-dimensional object indicates a three-dimensional shape of a visual-field area being sensed by the observer image sensing unit, and wherein positions of a front clipping surface and a rear clipping surface of the three-dimensional object with respect to a view point of the observer image sensing unit are determined based on an internal parameter of the observer image sensing unit;

a sensing step of sensing a real space by using an exhibiter image sensing unit;

a superimposing step of generating an image of mixed reality space by superimposing the three-dimensional object on an image of the real space obtained in said sensing step, based on position and orientation of the exhibiter image sensing unit; and a display step of displaying the image of mixed reality space on a display unit.

4. The apparatus according to claim 2, wherein said exhibiter image sensing unit and said display unit constitute a head mounted display.

5. The method according to claim 1, wherein the shape of the three-dimensional object is a quadrangular pyramid.

* * * * *